(12) United States Patent
Woodward

(10) Patent No.: US 8,362,736 B2
(45) Date of Patent: Jan. 29, 2013

(54) BLOWER MOTOR FOR HVAC SYSTEMS

(75) Inventor: Arthur E. Woodward, Manchester, MO (US)

(73) Assignee: Nidec Motor Corporation, St. Louis, MO (US)

( * ) Notice: Subject to any disclaimer, the term of this patent is extended or adjusted under 35 U.S.C. 154(b) by 1178 days.

(21) Appl. No.: 12/206,052

(22) Filed: Sep. 8, 2008

(65) Prior Publication Data

US 2010/0060214 A1   Mar. 11, 2010

(51) Int. Cl.
*H02P 1/26* (2006.01)
*H02P 1/04* (2006.01)

(52) U.S. Cl. ......... 318/772; 318/778; 318/798; 700/276

(58) Field of Classification Search .......... 318/772, 318/778, 779, 798, 799; 700/276, 281, 282; 388/934
See application file for complete search history.

(56) References Cited

U.S. PATENT DOCUMENTS

| | | | | |
|---|---|---|---|---|
| 4,815,524 A | * | 3/1989 | Dempsey et al. | 165/245 |
| 5,184,026 A | * | 2/1993 | O Breartuin | 307/139 |
| 5,818,194 A | * | 10/1998 | Nordby | 318/701 |
| 6,924,612 B2 | * | 8/2005 | Ramirez et al. | 318/280 |
| 7,257,341 B2 | * | 8/2007 | Hanamoto et al. | 399/67 |
| 7,268,505 B2 | * | 9/2007 | Pant et al. | 318/400.01 |
| 2008/0180048 A1 | | 7/2008 | Mullin et al. | |
| 2011/0068723 A1 | * | 3/2011 | Maiocchi | 318/400.3 |
| 2011/0204832 A1 | * | 8/2011 | Zavodny et al. | 318/400.3 |
| 2011/0260666 A1 | * | 10/2011 | Woodward | 318/433 |
| 2011/0260671 A1 | * | 10/2011 | Jeung | 318/701 |

\* cited by examiner

*Primary Examiner* — Eduardo Colon Santana
(74) *Attorney, Agent, or Firm* — Hovey Williams LLP

(57) ABSTRACT

A blower motor assembly having a variable speed motor that is suitable for direct, drop-in replacement in a residential HVAC (heating, ventilation, and air conditioning) system that employs a PSC motor. The blower motor assembly includes at least a neutral input and two hot AC line connections, one for connection to the heating power source and the other to the cooling power source. A sensing circuit senses which of the inputs is energized by sensing either voltage or current on the inputs. The sensing circuit delivers a corresponding signal to a motor controller to control the speed of the variable speed motor. The blower motor assembly may also be equipped with additional hot AC inputs, more than one neutral line, and several sensing circuits for sensing current or voltage in the hot inputs and/or the neutral lines for controlling various aspects of the variable speed motor.

25 Claims, 12 Drawing Sheets

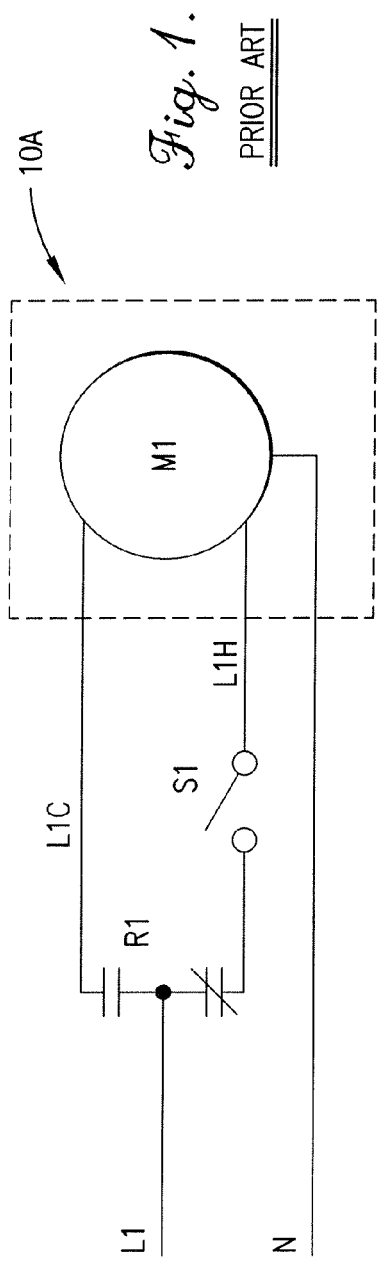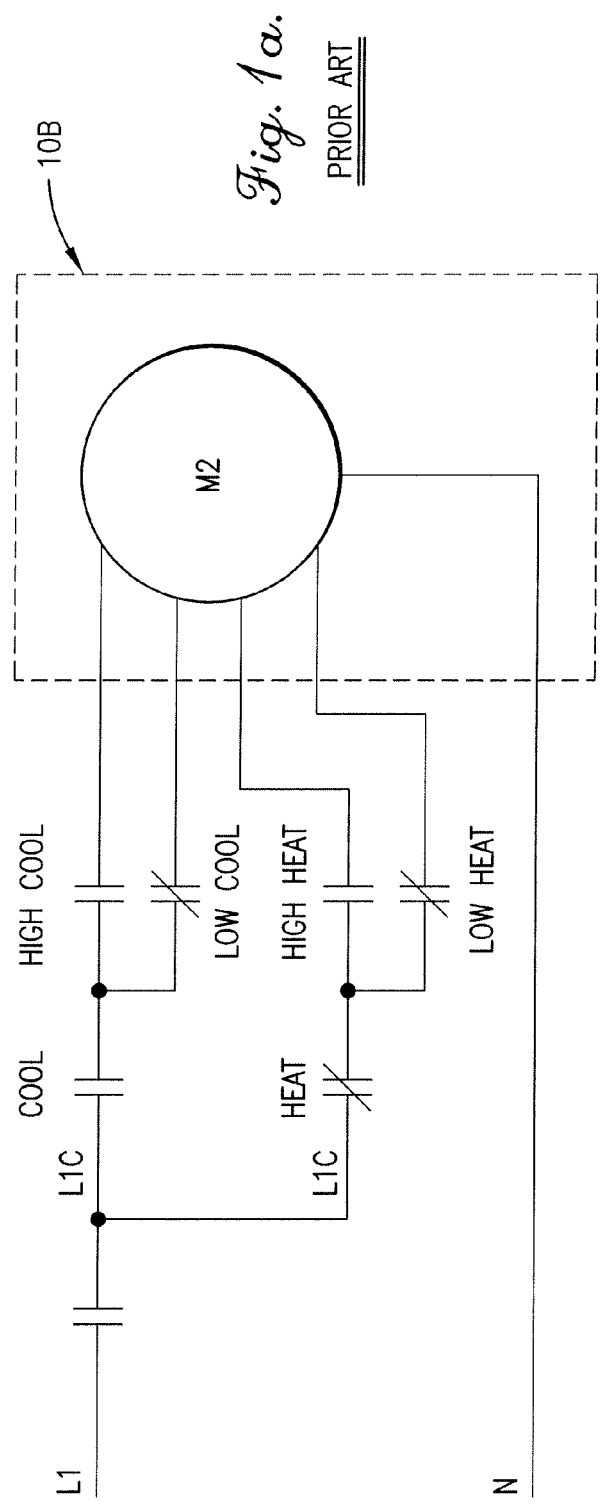

BLOWER MOTOR FOR HVAC SYSTEMS

RELATED APPLICATIONS

The present application is related to co-pending U.S. application Ser. No. 12/206,062, filed Sep. 8, 2008, entitled "BLOWER MOTOR FOR HVAC SYSTEMS"; U.S. application Ser. No. 12/206,066, filed Sep. 8, 2008, entitled "BLOWER MOTOR FOR HVAC SYSTEMS"; U.S. application Ser. No. 12/206,077, filed Sep. 8, 2008, entitled "BLOWER MOTOR FOR HVAC SYSTEMS"; U.S. application Ser. No. 12/206,085, filed Sep. 8, 2008, entitled "BLOWER MOTOR FOR HVAC SYSTEMS"; and U.S. application Ser. No. 12/206,087, filed Sep. 8, 2008, entitled "BLOWER MOTOR FOR HVAC SYSTEMS", all of which are incorporated herein in their entirety by reference.

FIELD OF INVENTION

The present invention relates to blower motors and controls used in residential heating, ventilation, and air conditioning (HVAC) systems. More particularly, embodiments of the invention relate to a replacement blower motor assembly that can be connected to the standard power terminals used for a permanent split capacitor (PSC) motor and such a blower motor assembly that can be used in Original Equipment Manufacturer (OEM) applications and other applications.

BACKGROUND

HVAC system efficiency increases have provided considerable reductions in energy use. For example, many high efficiency furnaces, air conditioners, and air handlers now have efficiencies (AFUE ratings) greater than 90%. However, the blower motors used to move the air in these systems have not seen significant efficiency improvements and have much lower efficiencies. As furnaces and air conditioners have become more efficient, the fraction of total energy consumption for HVAC systems attributed to the blower motors has increased, thus making blower motors a greater contributor to the overall system energy use.

Blower motor inefficiencies are magnified when a blower motor is operated for extended hours beyond that needed solely for heating and cooling. For example, some users frequently choose to let their HVAC system's blower motor operate continuously by setting a fan control switch to the "on" position. This circulation mode of operation reduces temperature stratification, minimizes start drafts from duct work, improves humidity control, and increases the effectiveness of associated air cleaners employed in conjunction with the HVAC system. By selecting the "on" position, the blower motor operates continuously, and the associated thermal feature, (i.e., either heating or cooling) operates on the "demand" setting of the thermostat. When in the "on" position, the blower motor typically operates at the speed used for cooling, even when the thermostat is set to heat mode. This speed is usually well in excess of what is necessary to achieve the air circulation benefits outlined above. This causes excess energy usage and noise. In addition, with the blower switch in the "on" position, the unit no longer is able to select the system speed for cooling or heating and instead continuously runs at the continuous fan speed. Even when systems are designed to select the proper speed in a multiple speed motor, for example, as disclosed in U.S. Pat. No. 4,815,524, the speed available for blower "on" use is higher than necessary for such operations, and can be responsible for cold spot corrosion, requiring a shut down period disclosed in the '524 patent. The increased operation time therefore leads to greater energy use.

Many of the above-described inefficiencies result from the type of blower motor used in HVAC systems. HVAC systems traditionally use fixed speed or multiple speed permanent split capacitor (PSC) motors. These motors generally have two independent power connections to accommodate heating or cooling modes of operation. The heating or cooling power inputs are normally connected to different winding taps in the PSC motor to provide somewhat different operating speeds for the blower in the respective modes of operation. More than two taps can be designed into the PSC motor, allowing the OEM or installer to select the operating speed by appropriate connection of the taps to the respective heating and cooling power connections. The energizing of these AC power connections to the motor is controlled by activation of a temperature switch and a relay driven from the thermostat.

An example of a fixed speed PSC motor M1 used in residential HVAC systems is shown in FIG. 1. In this configuration, the single phase AC supply voltage (normally 115 VAC or 230 VAC) is supplied by connections L1 and N, where L1 represents the hot side of the AC supply, and N is neutral, which is at earth potential in a typical 115 VAC residential distribution system. (In normal 230 VAC systems, another hot supply line would be substituted for the neutral line N.) The power to the motor is controlled by a relay R1 and a switch S1, which are both shown in their non-energized positions. The blower relay R1 is controlled by a thermostat.

In the position shown in FIG. 1, which is the normal position for the heating mode of operation, AC voltage is supplied to a power input connection L1H motor connection any time fan control switch S1 closes. The fan control switch S1 closes whenever the air temperature in the heat exchanger exceeds a predetermined setpoint. For a gas furnace system, this happens a short time after the gas burner is activated by signals from the thermostat once the thermostat reaches a trigger temperature. When fan control switch S1 closes, AC power is supplied to the motor M1, which will then start and run. The speed of motor M1 is a function of motor design, tap selection in the motor, blower characteristics and the aerodynamic system impedance. Motor M1 stops when fan control switch S1 turns off, which happens whenever the heat exchanger air temperature decreases below the setpoint.

Similarly, when the thermostat demands blower operation because of cooling demand, blower relay R1 closes and energizes the L1C motor connection, thus operating the motor at its cooling mode speed. Blower operation ceases when signals from the thermostat de-energize blower relay R1.

Referring now to FIG. 1A, another fixed speed PSC motor used in residential HVAC systems is shown. The motor has four winding taps to accommodate two heating fan speeds and two cooling speeds. The fan speed is controlled by a furnace control board with a cool/heat relay, a low/high cool relay, and a low/high heat relay. Other HVAC systems may include two heating stages and a single cooling stage or any other combination of heating and cooling speeds.

PSC motors are reasonably efficient when operated at high speed, but their efficiencies may drop down into the 20% range when operated at low speeds. Because air conditioner evaporator coils need higher airflow than furnace heat exchangers, the blower motor operates at a lower speed during furnace operation, where it is less efficient, and at an even lower speed still during continuous fan "on" operation, where it is least efficient.

Because of the above-described inefficiencies of PSC motors, many newer HVAC systems use variable speed motors such as brushless permanent magnet (BPM) motors and corresponding electronic variable speed motor controllers. The speed of a BPM can be electronically controlled and set specifically to match the airflow requirements for each application, thus permitting more efficient operation. Also, BPM motors use power approximately proportional to the cube of motor speed, whereas PSC motors use power approximately proportional to motor speed. therefore, as motor speed drops, BPM motors use less power than PSC motors over a wide range of motor speeds. This is particularly important when operating the blower continuously for circulation as described above.

While variable speed motors are often superior to PSC motors, replacing an existing PSC motor with a variable speed motor in a system similar to that illustrated in FIG. 1A has required costly, time-consuming, and complex changes in the mechanical, wiring, or control configuration of the system. Variable speed motor systems configured for replacement of PSC motors in existing HVAC systems have been developed, but they have relatively complicated control and sensing systems. For example, some systems require the installation of a temperature sensor in the outlet ductwork of the HVAC system for controlling the speed of the motor based upon temperature. In other replacement systems, the installation of a replacement motor requires continuous power connection to the motor and the connection of low voltage control signals directly from the thermostat to the motor. Making these connections can be cumbersome and difficult in an existing HVAC system. Moreover, these known systems lack the sensitivity to operate blowers at low operating speeds.

Another limitation of existing PSC and BPM motors is that HVAC OEMs often require motors with unique operating parameters (torque load, fan speed, rotation direction, etc.) to optimize the performance of their HVAC components. While multiple speed PSC motors and BPM motors offer some operational options, many of their operating parameters are fixed after manufacture and cannot be easily changed. Motor manufacturers, installers, and service contractors therefore must stock a diverse inventory of blower motors to accommodate the various different models of HVAC equipment.

It would therefore be desirable to provide an improved "drop-in" replacement for a PSC motor in an HVAC system to realize the advantages of a variable speed blower motor without requiring significant changes to the HVAC system. It would be further advantageous to reduce the complexity of such replacement systems by utilizing simple control circuits and eliminating the need for additional wiring, such as that used in conjunction with traditional variable speed motors and existing replacement variable speed motor systems. It would also be advantageous to provide an HVAC blower motor that could be customized to accommodate more HVAC systems.

SUMMARY

The present invention solves many of the above-described problems and other problems and provides a distinct advance in the art of HVAC blower motors and other electric motors.

One embodiment of the invention is a blower motor assembly broadly comprising a rectifier, a novel sensing circuit, a variable speed motor, and the motor's associated motor controller and power converter. Power to the blower motor assembly is provided via the same set of power input connections provided to the PSC motor M1 of FIG. 1, i.e., L1C, L1H and neutral N, so that the blower motor assembly can serve as a drop-in replacement for that portion of the PSC motor of FIG. 1 enclosed by the rectangle 10A.

One embodiment of the sensing circuit includes a current transformer CT, a resistor R1, a resistor R2, a diode D1, a transistor Q1, a resistor R3, a capacitor C1, and a resistor R4. Two primary benefits of the sensing circuit are its simplicity and sensitivity. Because the circuit comprises only a small current transformer, 4 resistors, a capacitor, a single transistor, and a diode, it is relatively simple to construct and fits in a small area such as on a small power input connector. Moreover, the use of a single transistor provides a relatively passive design that effectively senses current in L1C or L1H with a small current transformer. This is important, because a more sensitive sensing circuit can be used to sense a continuous fan speed input connection or other input carrying less current as described in more detail below.

Another embodiment of the invention is a blower motor assembly configured to replace a PSC motor with more than two hot power connections such as a PSC motor with a high speed, a medium speed, a low speed, and a continuous fan speed. The blower motor assembly of this embodiment may include five or more power inputs, three sensor circuits for detecting current in the five inputs, and combinational logic for controlling operation of the blower motor as a function of the current sensed by the three sensor circuits.

Another embodiment of the invention is a blower motor assembly equipped with a pair of neutral line inputs, for example a CW neutral input and a CCW neutral input. Power may be connected to either of the two neutral inputs to select a blower fan rotation or any other parameter of the motor. A sensing circuit is configured for sensing current in one of the neutral inputs and for providing a corresponding signal to the motor controller for controlling an operational parameter of the motor such as the motor's rotation direction.

Another embodiment of the invention aims to reduce the amount of high current wires brought into the enclosure of the blower motor assembly. Known HVAC blower motors are enclosed within a two-piece can, with the motor itself positioned in one of the portions and the motor controller and other electronics positioned in the other. Those skilled in the art will appreciate that known variable speed motor enclosures can include a myriad of wiring and electronics that are often difficult to identify when maintenance is required. Moreover, an abundance of wiring in a motor enclosure can cause magnetic interference between the wires and the motor itself. The present invention provides a novel power input connector that supports the input power connections and the sensing circuits described above near the exterior of the motor can. to reduce the number of high current wires extending into the can.

Another embodiment of the invention is a method for automatically sensing proper rotation direction of an HVAC blower motor. The design and orientation of the ducts, heat exchanger, evaporator coils, and other components of an HVAC system often necessitate either a CW or a CCW blower fan. HVAC installers therefore must stock both CW and CCW PSC motors for replacement purposes. Reversible motors can replace either a CW or a CCW PSC motor, but the installer still must be careful to select the proper rotation direction or else the HVAC system will not operate properly. The rotation sensing method of the present invention solves these problems by sensing the motor direction and automatically correcting it if it is wrong.

Another embodiment of the invention provides methods to adjust the torque settings of an HVAC blower motor. HVAC OEMs often desire blower motors specifically designed to work with their HVAC equipment. With PSC motors, motor manufacturers can accommodate such requests by changing the motor winding taps on their motors to achieve the desired torque ratings. Unfortunately, changing the motor winding taps to accommodate every OEM's exact specifications is time-consuming and costly and requires that many slightly modified motors be manufactured and stocked. The present invention makes it easier to customize HVAC motors for particular OEMs' needs, by providing a simple method of adjusting the torque values of a blower motor without changing the motor's winding taps or otherwise altering the motor's physical design. In particular, the torque values of the motor may be modified during manufacturing without the use of a computer or other device capable of individually changing all of the torque memory values stored in the motor memory. Instead, the torque values are automatically modified in the motor based upon a single maximum torque desired in the motor, as described herein.

By constructing a blower motor assembly as described herein, numerous advantages are realized. For example, the blower motor assembly of the present invention can be used as a relatively low-cost replacement for an inefficient fixed speed motor in an existing HVAC system. The replacement blower motor assembly uses less energy, allows for economical continuous fan operation, and is quieter than conventional fixed speed motors. Moreover, the blower motor assembly can be quickly and easily installed without requiring changes to the mechanical configurations, wiring, or control of the HVAC system. Embodiments of the blower motor assembly and related methods also permit a standard sized motor to be customized for many different applications, thus reducing the number of differently configured motors that must be manufactured and stocked. Still further, the sensing circuit of the blower motor assembly is simpler, more sensitive, and more compact than the sensing circuitry in prior art replacement blower motor assemblies. The blower motor assembly of the present invention may also be used in OEM and other non-replacement applications. Moreover, many aspects of the present invention may be separately useful without the motor, both for OEM and/or replacement use.

These and other important aspects of the present invention are described more fully in the detailed description below.

BRIEF DESCRIPTION OF THE DRAWING FIGURES

An exemplary embodiment of the present invention is described in detail below with reference to the attached drawing figures, wherein:

FIG. 1 is a schematic circuit diagram of a prior art blower motor and associated control circuitry for an HVAC system.

FIG. 1A is a schematic circuit diagram of a prior art blower motor and associated control circuitry for another HVAC system.

Figure 2:
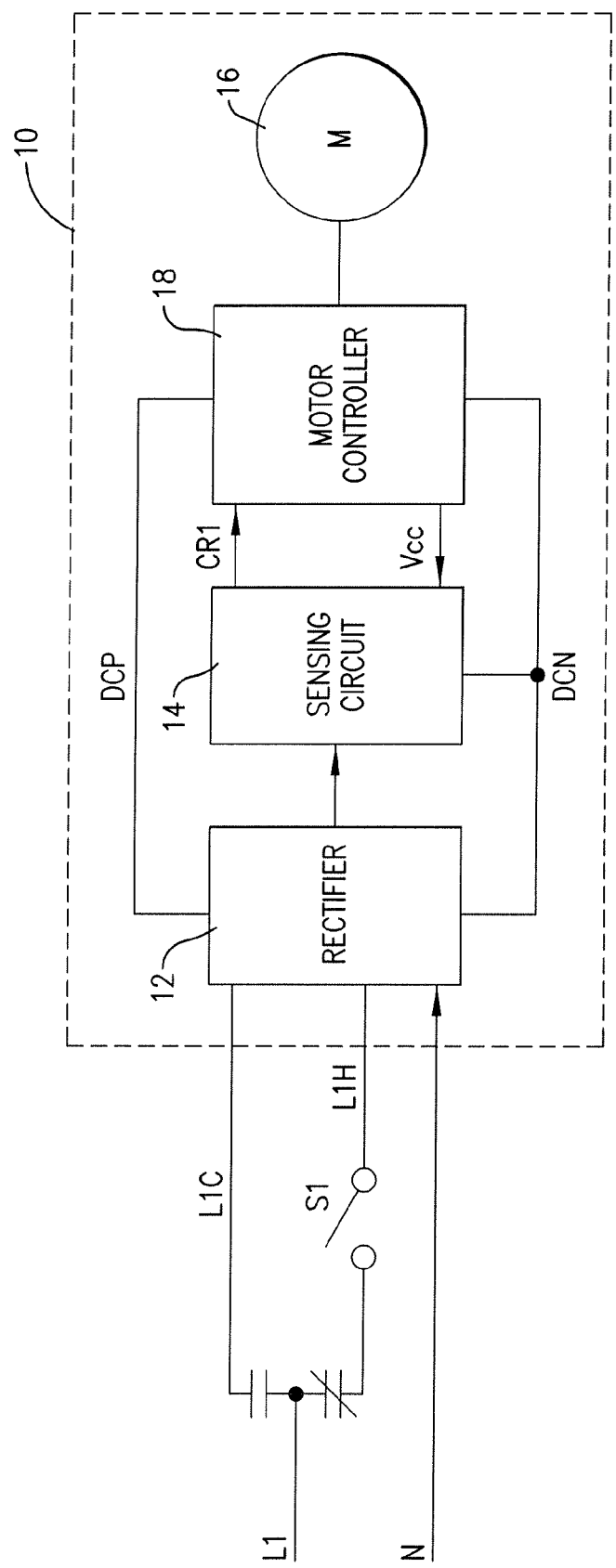
FIG. 2 is a schematic circuit diagram of a blower motor assembly constructed in accordance with an embodiment of the invention and shown wired to associated control circuitry of an HVAC system.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

Referring now to FIG. 2, a blower motor assembly 10 constructed in accordance with an embodiment of the invention is shown. The illustrated blower motor assembly 10 broadly comprises a rectifier 12, a novel sensing circuit 14, a variable speed motor 16, and the motor's associated motor controller and power converter 18. Power to the blower motor assembly 10 is provided via the same set of power input connections provided to the PSC motors M1 of FIGS. 1 and 1A, i.e., L1C, L1H, and neutral N, so that the assembly 10 can serve as a drop-in replacement for that portion of the PSC motors of FIGS. 1 and 1A enclosed by the rectangles 10A and 10B. However, the blower motor assembly 10 and other embodiments of the invention may also be used in OEM and other non-replacement applications. Moreover, many aspects of the present invention may be separately useful without the motor, both for OEM and/or replacement use.

Figure 3:
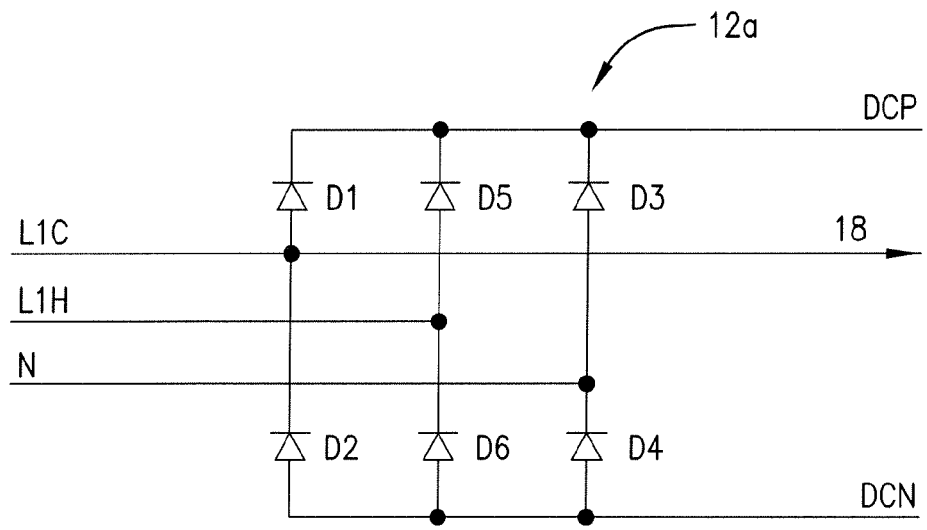
FIG. 3 is a schematic circuit diagram of an exemplary rectifier of the blower motor assembly shown in FIG. 2.
Figure 4:
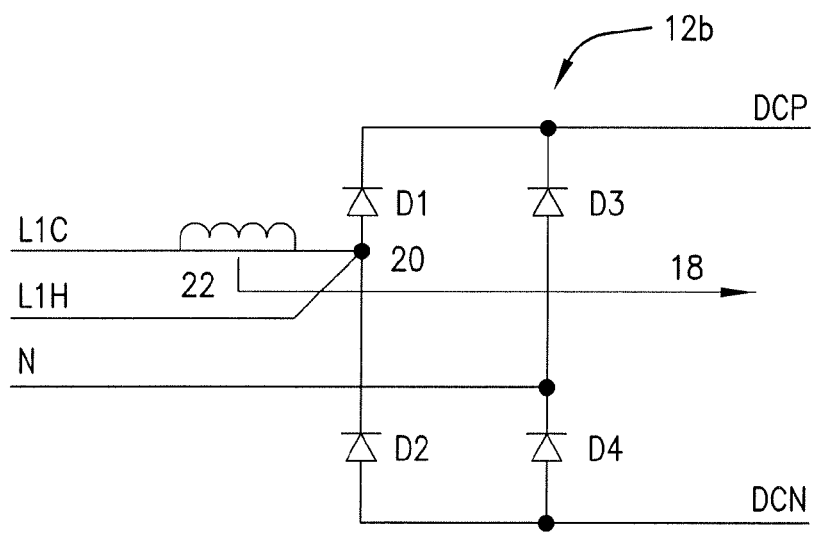
FIG. 4 is a schematic circuit diagram of another exemplary rectifier of the blower motor assembly shown in FIG. 2.

Returning to FIG. 2, the rectifier 12 is conventional and converts the AC power on the power input connections L1C, L1H and neutral N to DC power and delivers the DC power to the motor controller 18. FIGS. 3 and 4 show two versions of the rectifier, generally indicated 12a and 12b, with the rectifier 12a being used when the sensing circuit 14 is configured for voltage sensing and the rectifier 12b being used when the sensing circuit is configured for current sensing. As shown in FIGS. 3 and 4, both versions of the rectifier 12*a* and 12*b* include at least a rectifier bridge comprising diodes D1, D2, D3, and D4. For voltage sensing, the rectifier 12*a* must be modified to decouple the power sources, since if they are not decoupled, the L1C and L1H connections would have a tie point, making it impossible to determine the source of the voltage. FIG. 3 shows one way to decouple the AC supply inputs. An additional leg comprising diodes D5, D6 is added to the rectifier 12*a* to decouple power sources L1C and L1H, thus allowing the sensing circuit 14 to determine the source of the input power.

With current sensing shown in FIG. 4, the L1C and L1H inputs are connected together at an input 20 of the rectifier bridge. A current sense point 22 is ahead of the input 20. It will be recognized that, although sense point 22 is shown here in the L1C input, with appropriate modifications, it could alternately be in the L1H input. The current sensing technique requires no additional bridge diode leg, as does the voltage sensing technique, but does require isolation between the sense point 22 and a common DCN.

The sensing circuit 14 monitors L1C or L1H inputs and generates a corresponding logic level signal CR1 whenever AC power is detected in one of the inputs. Voltage sensing or current sensing may be used as mentioned above. Since the sensing scheme is used only to detect the presence or absence of voltage or current on the sensed input, significant accuracy is not required, so the complexity of either type of sense circuitry can be reduced.

Because a blower system characteristically has an output power proportional to the cube of the speed of the motor driving the fan, and since the current sensing technique is sensitive to the power fed to the motor, the current detection level and hysteresis must be selected to ensure that the correct sensing of the AC source is achieved over the operating speed and torque range of the motor. It will also be understood that current sensing can be done by a number of well-known sensing techniques, including but not limited to, for example, shunt sensors or current transformers.

Figure 5:
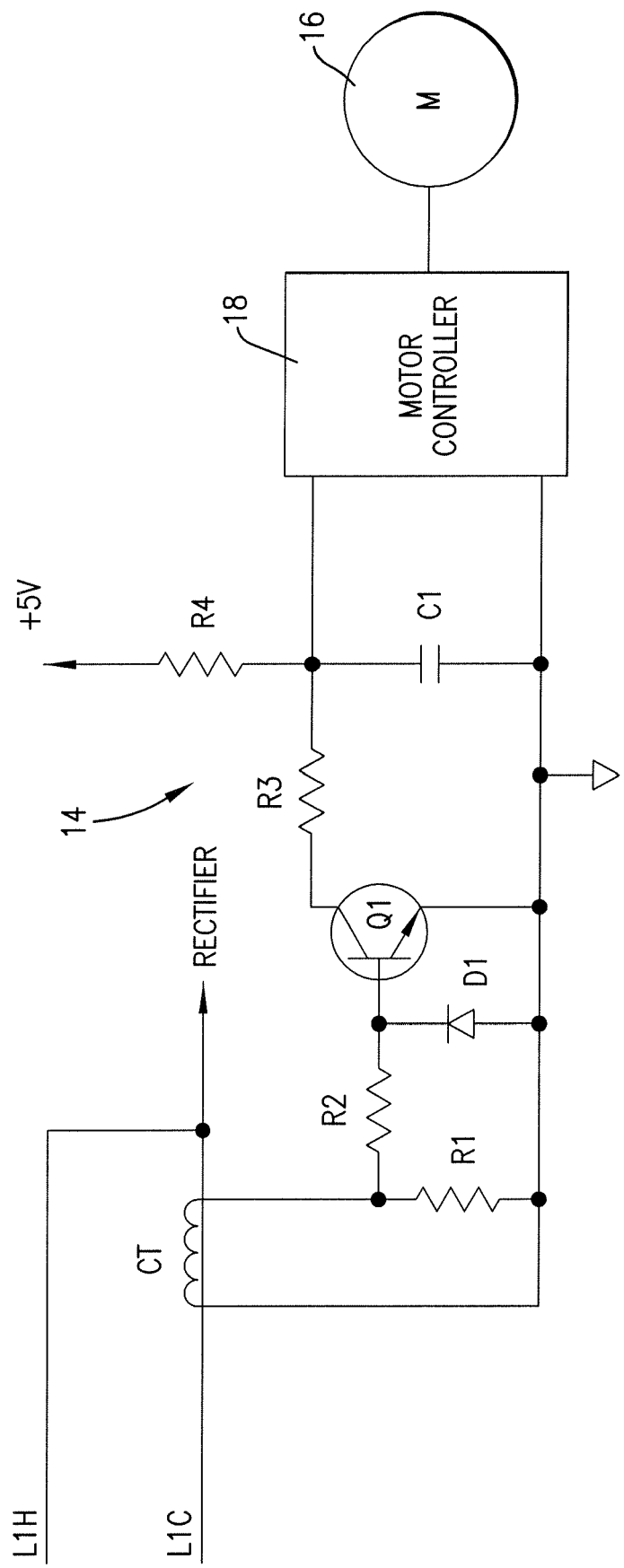
FIG. 5 is a schematic circuit diagram showing details of an embodiment of the sensing circuit of the blower motor assembly of FIG. 2.

FIG. 5 illustrates a current sensing embodiment of the sensing circuit 14 in more detail. The sensing circuit 14 includes a current transformer CT, a resistor R1, a resistor R2, a diode D1, a transistor Q1, a resistor R3, a capacitor C1, and a resistor R4. In an exemplary embodiment, the current transformer CT is a toroidal core transformer having about 30 or more turns, R1 is approximately 510 ohms, R2 is approximately 1K ohms, D1 is a 1N4148 high speed switching diode, Q1 is a 2N3904 NPN-type amplifying transistor, R3 is approximately 10 ohms, C1 is 0.1 μF, and R4 is approximately 100K ohms. But the particular sizes, properties, and types of these components are only provided to describe a particular exemplary embodiment of the invention and can be changed without departing from the scope of the claims.

The current transformer CT is inductively coupled with the L1C input of the AC power input connections and senses when current is flowing in the cooling power input connection L1C. The current transformer CT could instead be coupled with the heating power input connection L1H. CT couples the sensed current to the base of transistor Q1. R1 serves as a load resistor for defining a minimum load on the current transformer CT and R2 limits the peak current delivered to Q1. D1 protects the base emitter junction of Q1.

Q1 amplifies the pulses sensed by CT and delivers the amplified pulses through its collector to C1. R3 limits the current to C1 to approximately 300 milliamps. R4 serves as a pull-up resistor and charges C1 up to the illustrated 5 volt supply. The pulses from the transistor Q1 cause C1 to repetitively discharge, causing the input to the motor controller 18 to change, thus indicating current through L1C. The motor controller 18 may include a microprocessor and/or other electronics for sensing the signals from the sensing circuit 14. When current transformer CT has saturated or the current through L1C ends, R4 charges C1 back up to the 5 volt supply value. The goal is for the voltage of C1 to be below the logic threshold of the processor in the motor controller 18 for 3 to 5 milliseconds for accurate sensing.

When the sensing circuit 14 senses current in L1C as described above, the motor controller 18 operates the motor 16 to drive the blower fan at a speed selected for the cooling mode of the corresponding HVAC system. If the sensing circuit senses no current in L1C and when the switch S1 and relay R1 of FIG. 1 are both closed, the motor controller 18 operates the motor 16 to drive the blower at a speed selected for the heating mode of the corresponding HVAC system. The fan speeds for the cooling, heating, and other modes of operation may be programmed into the motor controller 18 during manufacture or may be selected by other means. The signals generated by the sensing circuit 14 and fed to the motor controller 18 can be used to select the speed of the motor, but may also be used to control any other parameter, such as, but not limited to, fan direction or torque.

Two primary benefits of the sensing circuit 14 of the present invention are its simplicity and sensitivity. Because the sensing circuit 14 comprises only a small current transformer, four resistors, a capacitor, a single transistor, and a diode, it is relatively simple to construct and fits in a small volume, such as on a small power input connector, an example of which is described in more detail below. Moreover, the use of a single transistor provides a relatively passive design that effectively senses current in power inputs L1C or L1H with a small current transformer. Known prior art sensing circuits for replacement HVAC blower motors use Schmitt trigger logic buffers to define a voltage level to switch between heating and cooling modes of operation. The required voltage level for these prior art sensing circuits is higher than that needed for a single transistor, thus necessitating a larger current transformer to achieve the same sensing sensitivity. This is important, because a more sensitive sensing circuit, such as the sensing circuit 14 disclosed herein, that can sense an instantaneous peak current as low as about two amps in a power input, can be used to sense a continuous fan speed input connection or other input carrying less current, as described in more detail below. In another exemplary embodiment, the sensing circuit 14 can sense an instantaneous peak current as low as about one amp in a power input.

Figure 6:
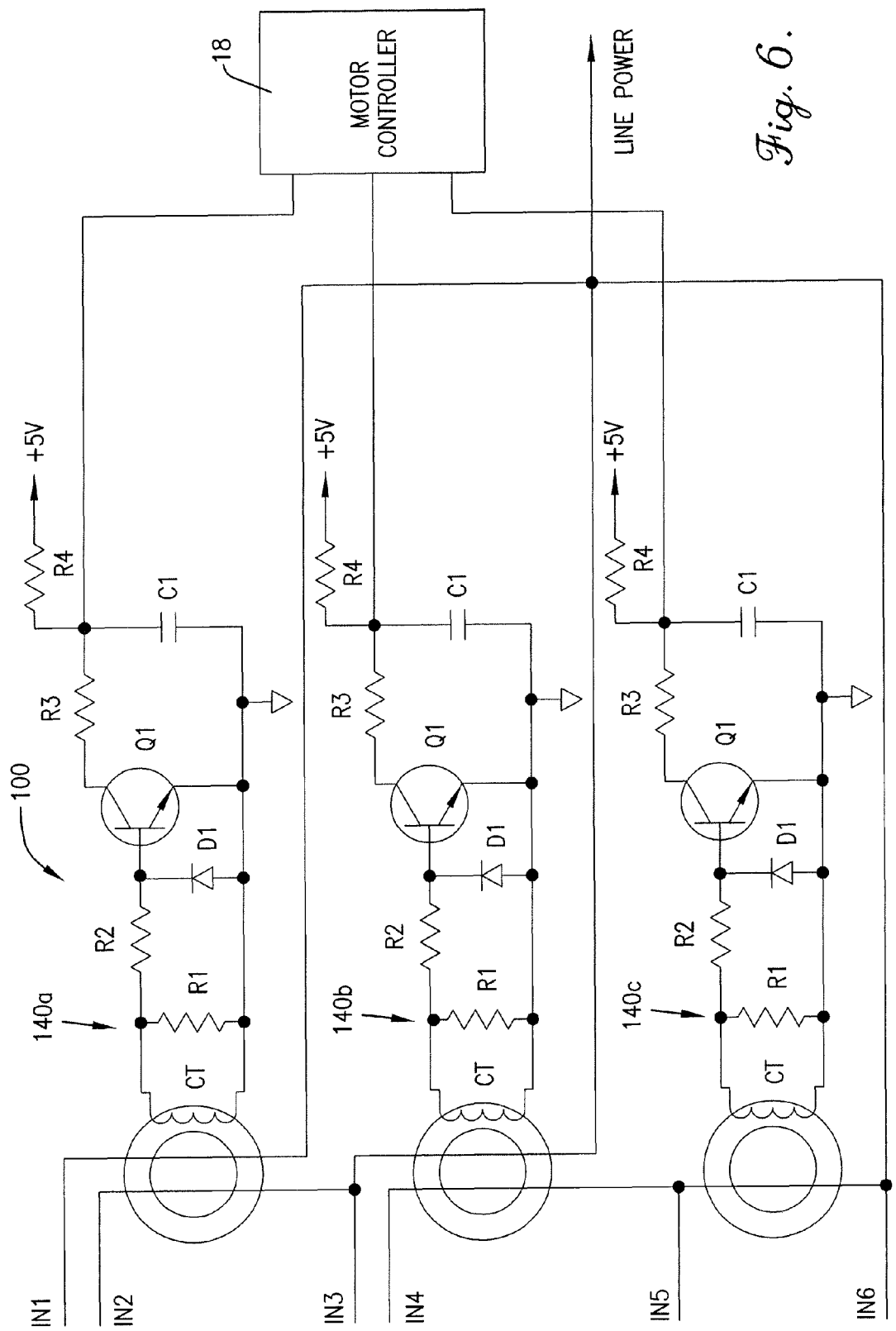
FIG. 6 is a schematic circuit diagram of a blower motor assembly constructed in accordance with another embodiment of the invention and having three sensing circuits.

The discussion up to this point has been for a blower motor assembly configured to replace a PSC motor M1 with two hot power connections, L1C and L1H. However, some PSC motors have additional winding taps to provide additional operating speeds, such as a high speed, a medium speed, a low speed, and a continuous fan speed. Blower motor assemblies configured for replacing these types of PSC motors must have additional power input connections and sensing circuits for sensing current in the power inputs. FIG. 6 illustrates a blower motor assembly 100 configured to replace such a PSC motor. The blower motor assembly 100 of FIG. 6 may also be used to replace a two-speed PSC motor, with the extra power input connections and sensing circuits providing an installer several different fan speeds to replace the two speeds of the PSC motor.

As illustrated, the exemplary blower motor assembly 100 includes six power connections IN1-IN6 and three sensing circuits, generally indicated 140*a*, 140*b*, and 140*c*, for sensing current in the inputs IN1-IN6 and for providing associated signaling to the motor controller 18 for selecting a corresponding fan speed or other motor parameter.

The power inputs IN1-IN6 may correspond to any set of operating parameters for the motor. In one exemplary embodiment, IN1 may correspond to a highest blower speed (e.g. 100%), IN2 may correspond to a medium/high blower speed (e.g. 90%), IN3 may correspond to a medium blower speed (e.g. 80%), IN4 may correspond to a medium/low blower speed (e.g. 70%), IN5 may correspond to a low blower speed (e.g. 60%), and IN6 may correspond to a minimum continuous fan blower speed (e.g. 50%).

The three sensing circuits 140a-c are substantially identical and are each configured for sensing the presence of current in one or more of the power inputs IN1-IN6. Specifically, sensing circuit 140a senses current in power inputs IN1 and IN2, sensing circuit 140b senses current in IN3 and IN4, and sensing circuit 140c senses current in IN5. IN6 is not sensed by any of the sensing circuits as explained below.

Each of the sensing circuits 140a-c operates in the same manner as the sensing circuit 14 of FIG. 5 and comprises a current transformer CT, a resistor R1, a resistor R2, a diode D1, a transistor Q1, a resistor R3, a capacitor C1, and a resistor R4. In an exemplary embodiment, each CT is a toroidal core transformer having about 30 or more turns, each R1 is approximately 510 ohms, each R2 is approximately 1K ohms, each D1 is a 1N4148 high speed switching diode, each Q1 is a 2N3904 NPN-type amplifying transistor, each R3 is approximately 10 ohms, each C1 is approximately 0.1 μF, and each R4 is approximately 100K ohms. Again, the particular sizes, properties, and types of these components are provided to describe a particular exemplary embodiment of the invention and can be changed without departing from the scope of the claims.

Figures 7, 8:
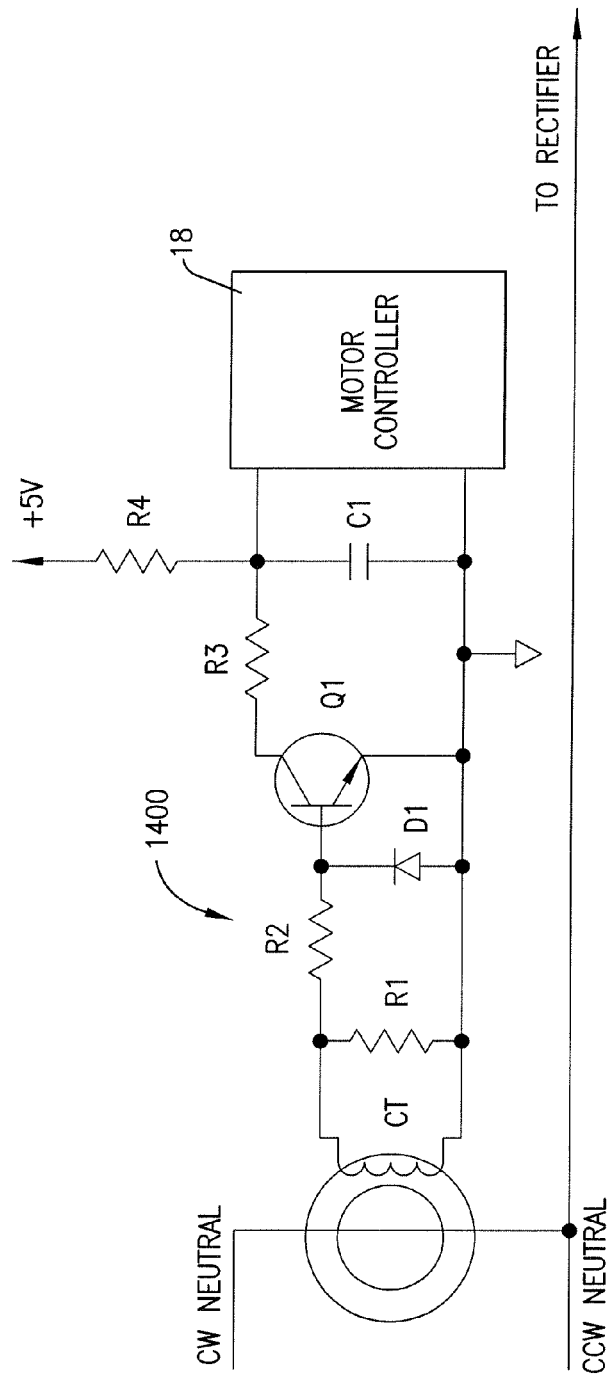
FIG. 7 is a truth table representing a logic function of the motor controller of the blower motor assembly.
FIG. 8 is a schematic circuit diagram of portions of a blower motor assembly constructed in accordance with another embodiment of the invention and having a sensing circuit for sensing power in a neutral line.

In accordance with an important aspect of the invention, the motor controller 18 receives signals from each of the sensing circuits 140a-c and selects a motor speed or other motor parameter based on a combination of the signals. FIG. 7 shows an exemplary truth table that may be utilized by the motor controller 18 to select a motor operating speed or other motor parameter based on the sensing of current in IN1-IN6. The first line of the truth table shows that sensing circuit 140a sensed current but sensing circuits 140b and 140c did not ("X" denotes sensing of current). This indicates that only power input IN1 was energized because if any of IN2-IN5 (IN6 will be discussed later) were also energized, sensing circuits 140b or 140c also would have sensed current. The motor controller 18 therefore selects a motor speed or other motor parameter (e.g., torque, power, airflow) associated with input IN1. For example, if input IN1 corresponds to the highest speed tap of the replaced PSC motor M1, the motor controller 18 may operate the variable speed motor 16 at a maximum speed (or highest selected speed).

The second line of the truth table shows that sensing circuits 140a and 140b both sensed current but sensing circuit 140c did not. This indicates that power input IN2 was energized because it is the only power input sensed by both sensing circuits 140a and 140b. The motor controller 18 therefore selects a motor speed or other parameter associated with IN2. The third line of the truth table shows that only sensing circuit 140b sensed current, thus indicating that power input IN3 was energized because only IN3 is monitored by sensing circuit 140b alone. The motor controller 18 therefore selects a motor speed or other motor parameter associated with IN3. The fourth line of the truth table shows that sensing circuits 140b and 140c sensed current, thus indicating that power input IN4 was energized because only it is sensed by both these sensing circuits. The motor controller 18 therefore selects a motor speed or other motor parameter associated with IN4. The fifth line of the truth table shows that only sensing circuit 140c sensed current, thus indicating that power input IN5 was energized, because IN5 is the only power input sensed by this sensing circuit. The motor controller 18 therefore selects a motor speed or other motor parameter associated with IN5.

The sixth line of the truth table indicates an additional operating mode enabled by the blower motor assembly 100 of FIG. 6. The sixth line shows that none of the sensing circuits 140a, 140b, 140c sensed current, indicating that none of the power inputs IN1-IN5 were energized. The sixth power input, IN6, is not sensed by the sensing circuits 140a, 140b, 140c and may be associated with a continuous fan speed for the motor 16. With this sixth input IN6, the motor controller 18 could operate the blower motor 16 at its lowest speed at all times until the HVAC system calls for heating or cooling and an associated higher blower speed.

The above-described blower motor assembly 100 permits selection between five or six motor speeds (or selection of five or six other motor parameters) with only three sensing circuits 140a-c. Moreover, each of the sensing circuits is simple to construct, relatively passive, and more sensitive than prior art sensing assemblies as discussed above.

In another exemplary embodiment of the invention, the blower motor assembly 10 or 100 may be equipped with a pair of neutral line inputs, for example a CW neutral input and a CCW neutral input. Power may be connected to either of the two neutral inputs to select a blower fan rotation direction or any other parameter of the motor.

FIG. 8 illustrates a sensing circuit 1400 configured for sensing current in one of the neutral inputs and for providing a corresponding signal to the motor controller 18. The neutral line sensing circuit 1400 is shown sensing the CW neutral line but instead could sense the CCW neutral line. The sensing circuit 1400 operates in the same manner as the sensing circuit 14 of FIG. 5 described above and includes a current transformer CT, a resistor R1, a resistor R2, a diode D1, a transistor Q1, a resistor R3, a capacitor C1, and a resistor R4. In an exemplary embodiment, CT is a toroidal core transformer having about 30 or more turns, R1 is approximately 510 ohms, R2 is approximately 1K ohms, D1 is a 1N4148 high speed switching diode, Q1 is a 2N3904 NPN-type amplifying transistor, R3 is approximately 10 ohms, C1 is approximately 0.1 μF, and R4 is approximately 100K ohms. Again, the particular sizes, properties, and types of these components are provided to describe a particular exemplary embodiment of the invention and can be changed without departing from the scope of the claims.

As mentioned above, an installer can connect a neutral power cable to either the CW neutral input or the CCW neutral input to select between different motor parameters. In one embodiment, the CW and CCW inputs are used to select the fan direction for a reversible blower motor 16. Specifically, if the sensing circuit 1400 senses current in the CW input, the motor controller 18 operates the motor in a CW fan rotation, as directed by the installer. Conversely, if the sensing circuit 1400 senses no current in the CW input, the motor controller 18 operates the motor in a CCW fan rotation, as directed by the installer.

In other embodiments, an installer can connect a neutral power cable to the CW or CCW neutral inputs to select between other motor parameters, such as speed tables, torque tables, mode selection, blower coefficients, and rotation direction of the motor. In one example, the CW input may be associated with a first speed table and the CCW input may be associated with a second speed table. In this case, the CW and CCW inputs may instead be labeled as "Speed Table 1" and "Speed Table 2" inputs). Here are two exemplary first and second speed tables that may be stored in memory of the motor controller:

| Speed Table 1 |
| --- |
| IN1 - 100% |
| IN2 - 90% |
| IN3 - 80% |
| IN4 - 70% |
| IN5 - 60% |

| Speed Table 2 |
| --- |
| IN1 - 95% |
| IN2 - 85% |
| IN3 - 75% |
| IN4 - 65% |
| IN5 - 55% |

When the sensing circuit 1400 of FIG. 8 senses current in the CW neutral input (or Speed Table 1 input), it signals the motor controller 18 to use the first speed table. The motor controller then uses the corresponding speed values for the power inputs IN1-IN5 described above. For example, if the sensing circuit 1400 of FIG. 8 senses current in the CW or Speed Table 1 input, and the sensing circuits 140a-c of FIG. 6 and truth table of FIG. 7 determine that current is flowing in IN3, the motor controller operates the fan at a speed (or torque) of 80% from Speed Table 1. Similarly, if the sensing circuit of FIG. 8 senses no current in the CW (or Speed Table 1) input, and the sensing circuits 140a-c of FIG. 6 and truth table of FIG. 7 determine that current is flowing in IN4, the motor controller operates the fan at a speed of 65% from Speed Table 2. The speed tables listed and described above can of course be replaced with other speed tables. These different speed tables provide for system customization, such as between heating and cooling operating modes, different types and sizes of mating equipment (e.g., fans, air conditioners), and different environmental conditions (e.g., different climatic regions).

For example, the two CW and CCW neutral inputs and corresponding neutral sensing circuit 1400 may also be used to select between fast and slow motor speed ramps. A fast ramp-up could take 2-5 seconds similar to the way a PSC motor starts up. A slow ramp-up could take 30 seconds to slowly and quietly ramp up to the selected speed, so as to produce less noise and vibration and be generally less noticeable in a home environment. The CW neutral input could be assigned to fast ramp-up and the CCW neutral input could be assigned to the slow ramp-up. When the neutral sensing circuit 1400 senses current in the CW neutral input, it signals the motor controller 18 to use the faster ramp-up. In most HVAC operating modes, the circulation airflow does not have to turn on instantly because there is a time lag between when the thermostat calls for heat and the heat exchanger is warmed up sufficiently to heat the air blown over the heat exchanger. There would also be a delay in cooling mode for the evaporator coil to become cooled down sufficiently to cool the air moving through the coil. Thus, the fast and slow ramp-ups may include an initial delay, such as between about 30 seconds and about 60 seconds.

Another aspect of the invention aims to reduce the amount of high current wires brought into an enclosure 26 (FIG. 11) of the blower motor assembly 10 or 100. Known HVAC blower motors M are enclosed within a two-piece can, with the motor itself positioned in one of the portions and the motor controller and other electronics positioned in the other. Those skilled in the art will appreciate that known variable speed motor enclosures include a myriad of wiring and electronics that are often difficult to identify when maintenance is required. Moreover, an abundance of wiring in a motor enclosure 26 can cause magnetic interference between the wires and the motor itself. To alleviate these problems, the present invention includes a novel power input connector 24 (FIGS. 9-11) that supports the input power connections and the sensing circuits described above near the exterior of the motor can.

Figure 10:
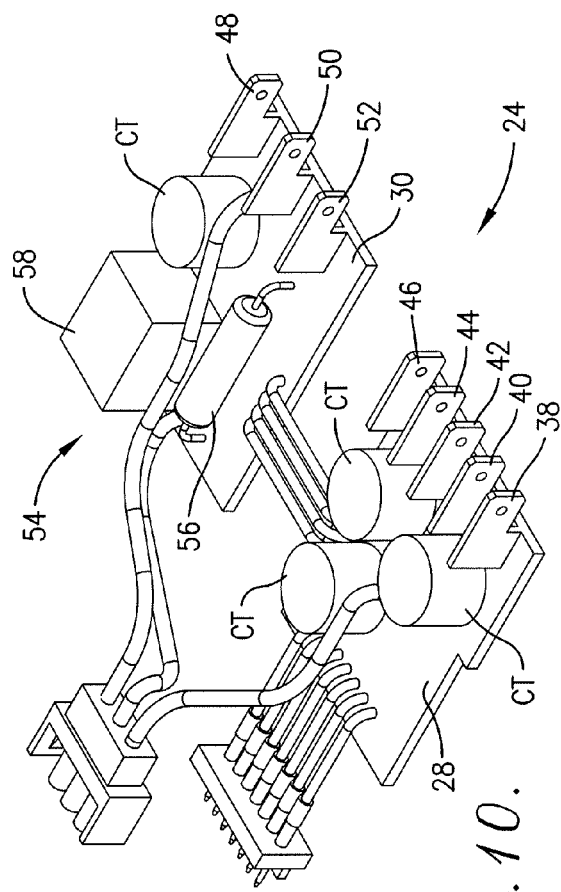
FIG. 10 is an exploded view of components of a power input connector constructed in accordance with another embodiment of the invention.
Figure 11:
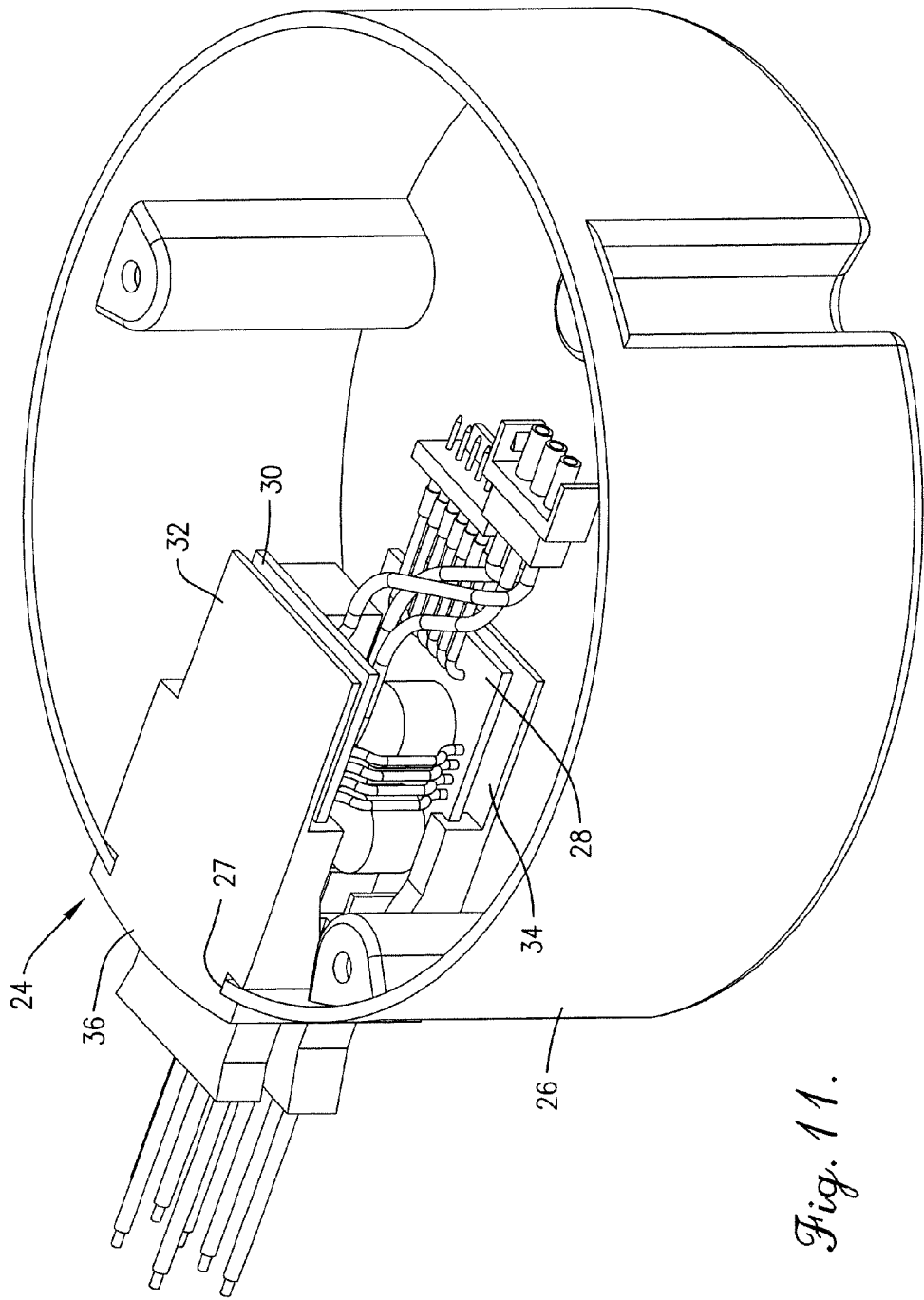
FIG. 11 is a perspective view of the power input connector of FIG. 10 shown assembled and mounted in a motor enclosure.

FIG. 10 illustrates an embodiment of the power input connector, generally indicated 24, shown partially disassembled and FIG. 11 shows the assembled power connector mounted within an opening of the motor controller portion of the motor enclosure, or can, 26. The exemplary power input connector 24 includes a pair of circuit boards 28, 30, top and bottom covers 32, 34, and a front face 36.

Figure 9:
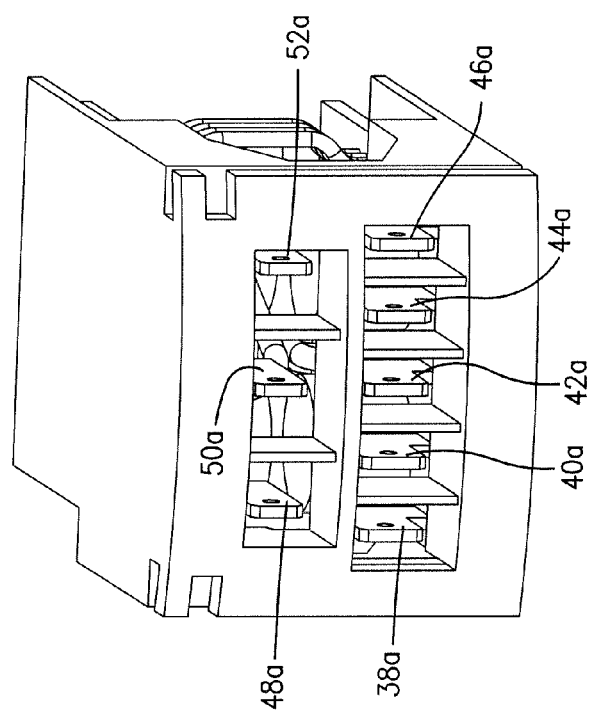
FIG. 9 is a perspective view of a power input connector constructed in accordance with another embodiment of the invention.

The power input connector 24 is assembled by stacking the circuit boards 28, 30 and then sandwiching the circuit boards between the covers 32, 34 and shielding one edge of each of the circuit boards with the face 36. The assembled power input connector 24 is then inserted in the illustrated opening 27 of the motor can 26. Note that the illustrated power input connector is of one exemplary construction and may be readily modified without departing from the scope of embodiments of the invention, such as when modified for mass manufacture. For example, FIG. 9 illustrates another embodiment of the power input connector, generally indicated 24a, that may be more suitable for mass production. Many other variations of the power input connector also fall within the scope of the present invention.

Returning to FIG. 10, the first circuit board 28 supports five hot AC line inputs 38, 40, 42, 44, 46 (e.g. IN1-IN5) and components of the sensing circuits 140a, 140b, and 140c of FIG. 6, including the three current transformers CT. Jumpers may be connected to the inputs 38-46 and threaded through the middles of the current transformers CT so the current transformers can sense current in the inputs as described above. Placement of the current transformers CT on the circuit board 28 adjacent the AC line inputs 38-46 and the use of short, relatively small jumpers reduces the amount of high current wiring that enters the enclosure 26.

The second circuit board 30 supports a pair of neutral inputs 48, 50 (e.g. CW neutral and CCW neutral), a ground input 52, and components of the neutral line sensing circuit 1400 of FIG. 8, including its current transformer CT. A jumper may be connected to one of the neutral inputs 48, 50 and threaded through the current transformer CT. As with the sensing circuits 140a, 140b, 140c for the AC line inputs, placement of the neutral sensing current transformer CT on the circuit board 30 adjacent the neutral line inputs 48, 50 reduces the amount of high current wiring that enters the enclosure 26.

The second circuit board 30 may also support a novel in-rush protection circuit, generally indicated 54, comprising an in-rush limiting resistor 56 and a relay 58. Prior art HVAC motors typically include an NTC thermistor or other type of in-rush limiting device. However, repeatedly applying power to the motor controller eventually damages the NTC in-rush limiter, bridge rectifier, and bus caps. The charging resistor 56 limits the initial current flow to the DC bus and the relay 58 bypasses the resistor 56 once the bus is charged. This reduces the in-rush currents and prolongs the life of the bridge rectifier, bus caps, and external relays and switches used to apply power to the motor.

Another embodiment of the invention is a method for automatically detecting proper rotation direction of an HVAC blower motor. The design and orientation of the ducts, heat exchanger, evaporator coils, and other components of an HVAC system often necessitate either a CW or a CCW blower fan. HVAC installers therefore must stock both CW and CCW PSC motors for replacement purposes. The blower motor assemblies 10, 100 of the present invention may include reversible motors 16 for replacing either a CW or a CCW PSC motor. But the installer must be careful to select the proper rotation direction, or the HVAC system will not operate properly. The rotation detecting method of the present invention solves these problems by detecting the response of the motor automatically correcting an improper direction of rotation.

The rotation detecting method considers the fact that most HVAC motors attached to a unidirectional fan exhibit noticeably different characteristics when rotating the fan in the wrong direction, as compared with rotating the fan in the intended direction. Considering torque as an exemplary characteristic, most HVAC motors have a noticeably lower torque when rotating the fan in the wrong direction, as compared with rotating the fan in the intended direction. This exemplary method of the present invention detects whether the torque load on the blower motor 16 appears to be appropriate for the speed of the blower. For example, if a high blower speed and low torque is seen, the method deduces that the blower is turning in the wrong direction. The motor controller 18 therefore stops the motor 16 and electronically reverses its direction. The motor controller 18 then starts the motor 16 in the other direction and confirms the torque is appropriate for a given speed. When the higher torque is confirmed, the motor controller 18 re-programs its memory to note the correct rotation for the next start-up. Similarly, other parameters such as motor speed could be used to determine the correct rotation direction by comparing the speed of rotation in either direction for a given torque. When the direction exhibiting the lower speed at the same torque is confirmed, the motor controller 18 re-programs its memory to note this direction as the correct rotation for the next start-up.

Figure 12:
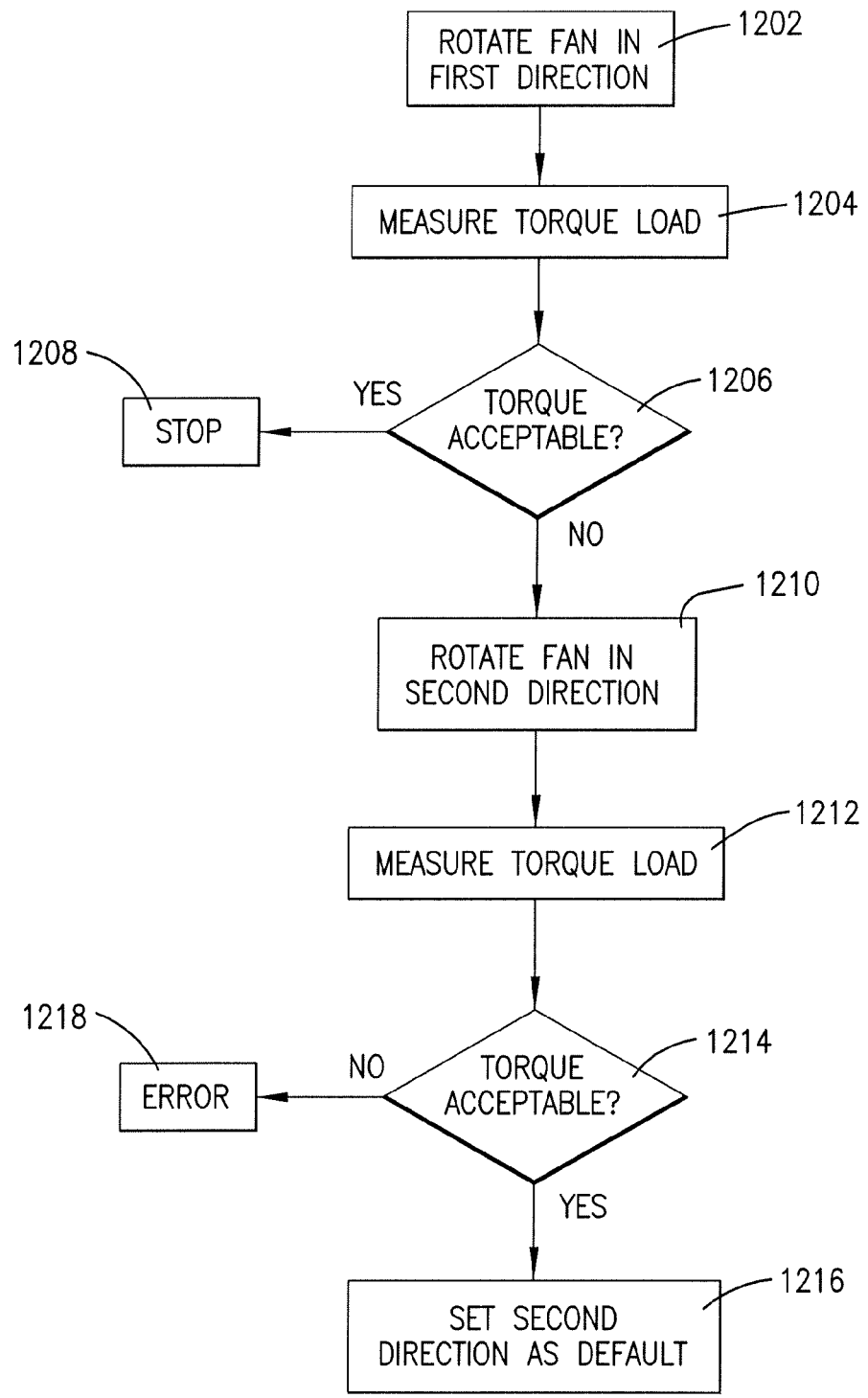
FIG. 12 is a flow diagram depicting a method for determining the proper rotation direction of a blower motor.

FIG. 12 shows another exemplary method 1200 for determining proper rotation direction of a reversible motor in an HVAC system. The particular order of the elements in FIG. 12 and described herein can be altered without departing from the scope of the invention. For example, some of the elements may be reversed, combined, or even removed entirely. In element 1202, a motor controller such as motor controller 18 starts a motor, such as motor 16, to rotate the fan in a first direction. Since many HVAC systems are configured for CCW fan rotation, the motor controller may initially start the motor in the CCW direction, but it may be that the system requires CW direction. In element 1204, the motor controller or other mechanism monitors a torque load on the motor while the fan is rotated in the first direction. Other operating parameters or characteristics other than torque load (such as power, airflow, or speed) may also be monitored. In element 1206, the motor controller determines if the monitored torque load or other parameter or characteristic is within an acceptable range. For example, if the motor is rated at 0.5 hp with a maximum rated torque of 30 inch-lbs., the motor controller or other mechanism may determine if the monitored torque is greater than about 20%, or about 6 inch-lbs. If it is, the method stops at element 1208 and the motor controller thereafter always rotates the motor in the first direction. However, if element 1206 determines that the torque load is not within an acceptable range, element 1210 directs the motor controller to rotate the motor and fan in a second direction, in this example the CW direction. In element 1212, the motor controller or other mechanism monitors the torque load on the motor while the fan is rotated in the second direction. As would be understood by one skilled in the art, the parameter monitored in the second direction (i.e., the second parameter), may be the same parameter as was monitored in the first direction (i.e., the first parameter) or a different parameter, without departing from the scope of the embodiments of the invention. In element 1214, the motor controller determines if the second monitored torque load is within the acceptable range. If it is, element 1216 changes a memory setting of the motor controller to indicate that the second direction is the proper rotation direction. Thereafter, the motor controller always rotates the motor in the second direction. If the motor torque load was not within an acceptable range in either elements 1206 or 1214, element 1218 may provide an error message or may revert to element 1202 to start the method over.

Figure 13:
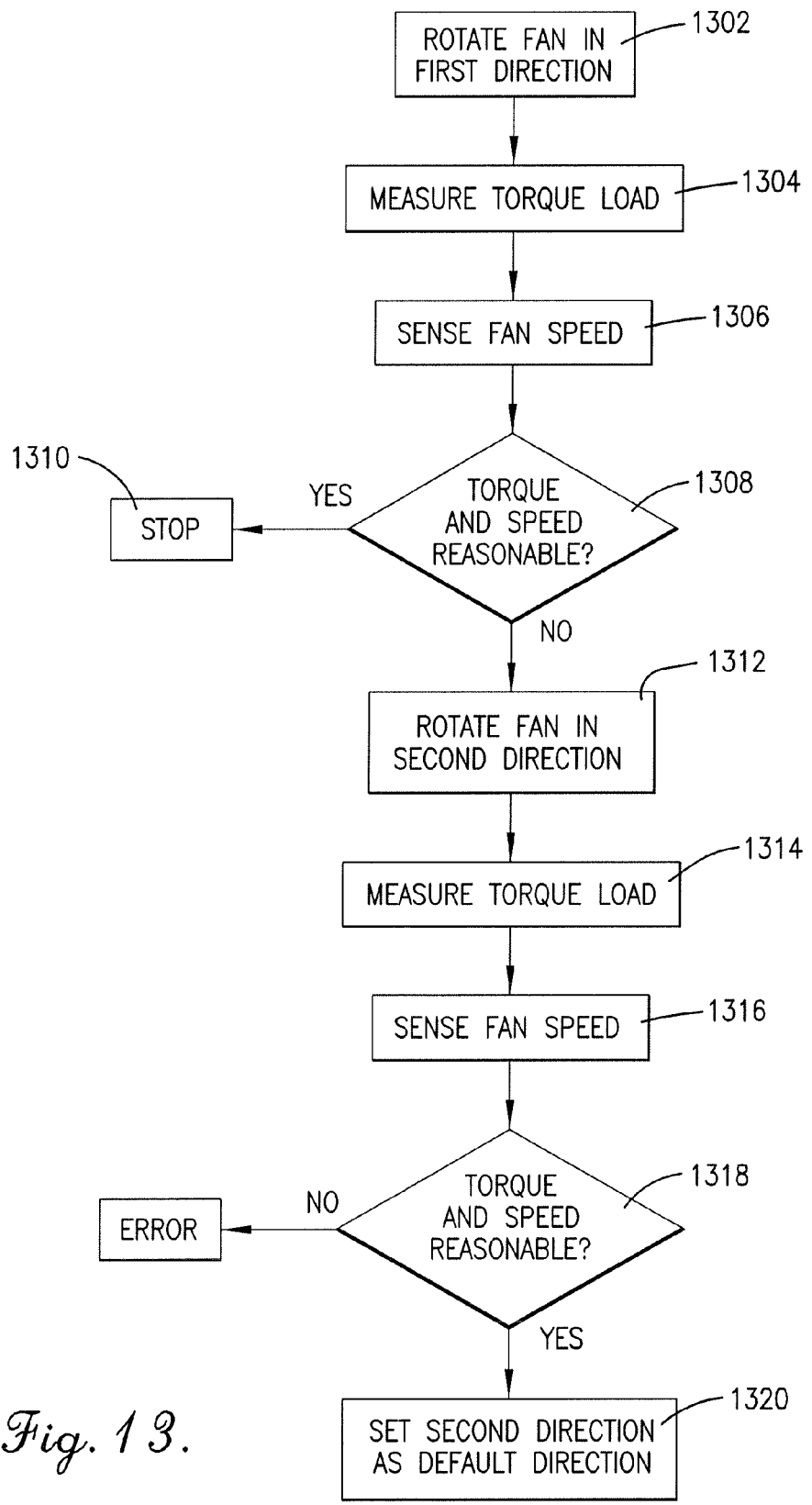
FIG. 13 is a flow diagram depicting another method for determining the proper rotation direction of a blower motor.

FIG. 13 shows another exemplary method for determining proper rotation direction of a reversible motor in an HVAC system. Method 1300 is similar to method 1200 except that method 1300 takes into account both a monitored motor torque load (or other operating parameter or characteristic) and a fan speed. The particular order of the elements in FIG. 13 and described herein can be altered without departing from the scope of the invention. For example, some of the elements may be reversed, combined, or even removed entirely. Method 1300 starts with element 1302 where the motor controller rotates the fan in a first direction. In element 1304, the motor controller or other mechanism monitors a torque load on the motor while the fan is rotated in the first direction. In element 1306, the motor controller monitors a rotation speed of the fan, either with a sensor or by controlling the motor to a desired speed, as in the described embodiment. Element 1308 determines if the monitored torque load is appropriate for the monitored rotation speed. Using the same 0.5 hp motor mentioned above as an example, element 1302 may determine if the monitored torque is approximately 6 inch-lbs, while the motor is rotating between about 500 and about 800 RPMs, an acceptable range for this torque level. Other comparisons may also be made, as long as the comparisons determine whether the monitored torque load is appropriate for the monitored blower speed. If the load is appropriate, method 1300 stops at element 1308 and the motor controller thereafter always rotates the motor in the first direction. If the load is not appropriate, element 1312 operates the motor to rotate the fan in a second direction. Element 1314 re-monitors the torque load on the motor while the fan is rotated in the second direction, and element 1316 monitors a rotation speed of the fan while the fan is rotated in the second direction. Element 1318 determines if the second monitored torque load is appropriate for the monitored rotation speed for the second direction. If it is, element 1320 changes a memory setting of the motor controller to indicate that the second direction is the proper rotation direction. If the motor torque load was not within an acceptable range in either elements 1306 or 1314, element 1318 may provide an error message or may revert back to element 1302 to start the method over.

Another embodiment of the invention provides methods to adjust the torque settings of an HVAC blower motor. HVAC OEMs often desire blower motors specifically designed to work with their HVAC equipment. For example, a blower motor manufacturer's typical 0.5 hp blower motor may have a maximum rated torque capability of 30 inch-lbs., but one OEM may desire that the motor have a maximum rated torque capability of 27 inch-lbs. (or 90%) and another OEM may desire a maximum rated torque capability of 24 inch-lbs. (or 80%). With PSC motors, motor manufacturers can accommodate such requests by changing the motor winding taps on their motors to achieve the desired torque ratings. Unfortunately, changing the motor taps to accommodate every OEM's exact specifications is time-consuming and costly and requires that many slightly modified motors be manufactured and stocked.

The present invention makes it easier to customize HVAC motors for particular OEMs' needs by providing a method of adjusting the torque values of a blower motor without changing the motor's taps or otherwise altering the motor's physical design. The methods are used with variable speed motors such as those described above in connection with the other embodiments of the present invention, but may be used with any conventional motors.

An obstacle to adjusting the torque settings of an HVAC blower motor is that most such motors have no accessible computer inputs or other control inputs after they are manufactured. Instead, as disclosed above, known HVAC blower motors only have 2-5 exposed hot power inputs (e.g., IN1-IN5), 1 or more neutral inputs (e.g. CW neutral and CCW neutral), and a ground input. Thus, the present invention's methods to adjust a motor's torque settings must be accomplished with these exposed inputs.

Figure 14:
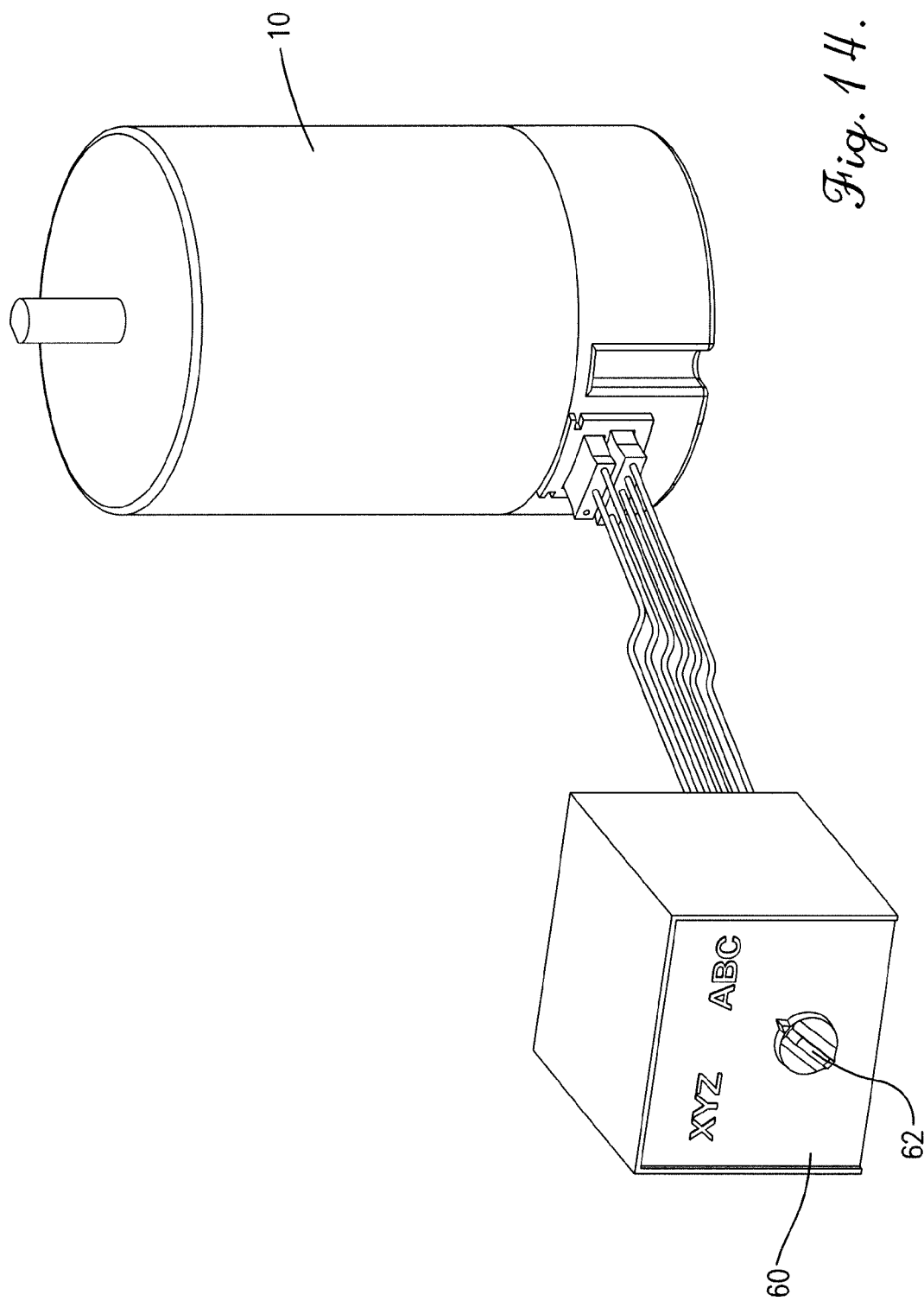
FIG. 14 is a schematic diagram of a torque adjustment mechanism constructed in accordance with an embodiment of the invention and shown coupled with a blower motor.

FIG. 14 illustrates a torque adjustment mechanism 60 constructed in accordance with an embodiment of the invention that may be used by an HVAC OEM or anyone else to adjust the torque settings of a motor such as the blower motor assembly 10 shown in FIG. 2 or the blower motor assembly 100 shown in FIG. 6. As illustrated, the torque adjustment mechanism 60 only connects to the exposed power inputs of the blower motor assembly.

The torque adjustment mechanism 60 may include a user interface, such as a selector switch 62, to select a torque adjustment for a particular HVAC system. Assume, for example, an OEM has XYZ and ABC models of HVAC equipment. The XYZ model may be optimized with a blower motor having a maximum torque capability of 26.1 inch-lbs., and the ABC model may be optimized with a blower model having a maximum torque capability of 28.5 inch-lbs. The selector switch 62 of torque adjustment mechanism 60 may therefore include an XYZ setting and an ABC setting. As would be readily understood by one skilled in the art, the user interface may provide for selection between more than two settings or for the introduction of user-defined settings, as described below.

To adjust a motor's multiple torque settings, the torque adjustment mechanism 60 is first attached to a motor's power input connections. As used herein, the term multiple torque settings means two or more torque settings, such as the five torque settings described below. For example, the torque adjustment mechanism may be attached to a 0.5 hp blower motor having a maximum torque capability of 30 inch-lbs. The motor may have 5 power inputs with the following torque settings:

| Standard Motor | |
|---|---|
| IN1 - 100% | 30 inch-lbs. |
| IN2 - 90% | 27 inch-lbs. |
| IN3 - 80% | 24 inch-lbs. |
| IN4 - 70% | 21 inch-lbs. |
| IN5 - 30% | 9 inch-lbs. |

When this motor is attached to the torque adjustment mechanism and the selector is moved to the XYZ setting described above, the torque adjustment mechanism adjusts the torque settings of the motor as follows:

| XYZ Motor | |
|---|---|
| IN1 - 100% | 26.1 inch-lbs. |
| IN2 - 90% | 23.5 inch-lbs. |
| IN3 - 80% | 20.9 inch-lbs. |
| IN4 - 70% | 18.3 inch-lbs. |
| IN5 - 30% | 7.8 inch-lbs. |

Similarly, if the ABC setting is selected, the torque adjustment mechanism adjusts the torque settings of the motor as follows:

| ABC Motor | |
|---|---|
| IN1 - 100% | 28.5 inch-lbs. |
| IN2 - 90% | 25.7 inch-lbs. |
| IN3 - 80% | 22.8 inch-lbs. |
| IN4 - 70% | 20.0 inch-lbs. |
| IN5 - 30% | 8.6 inch-lbs. |

Figure 15:
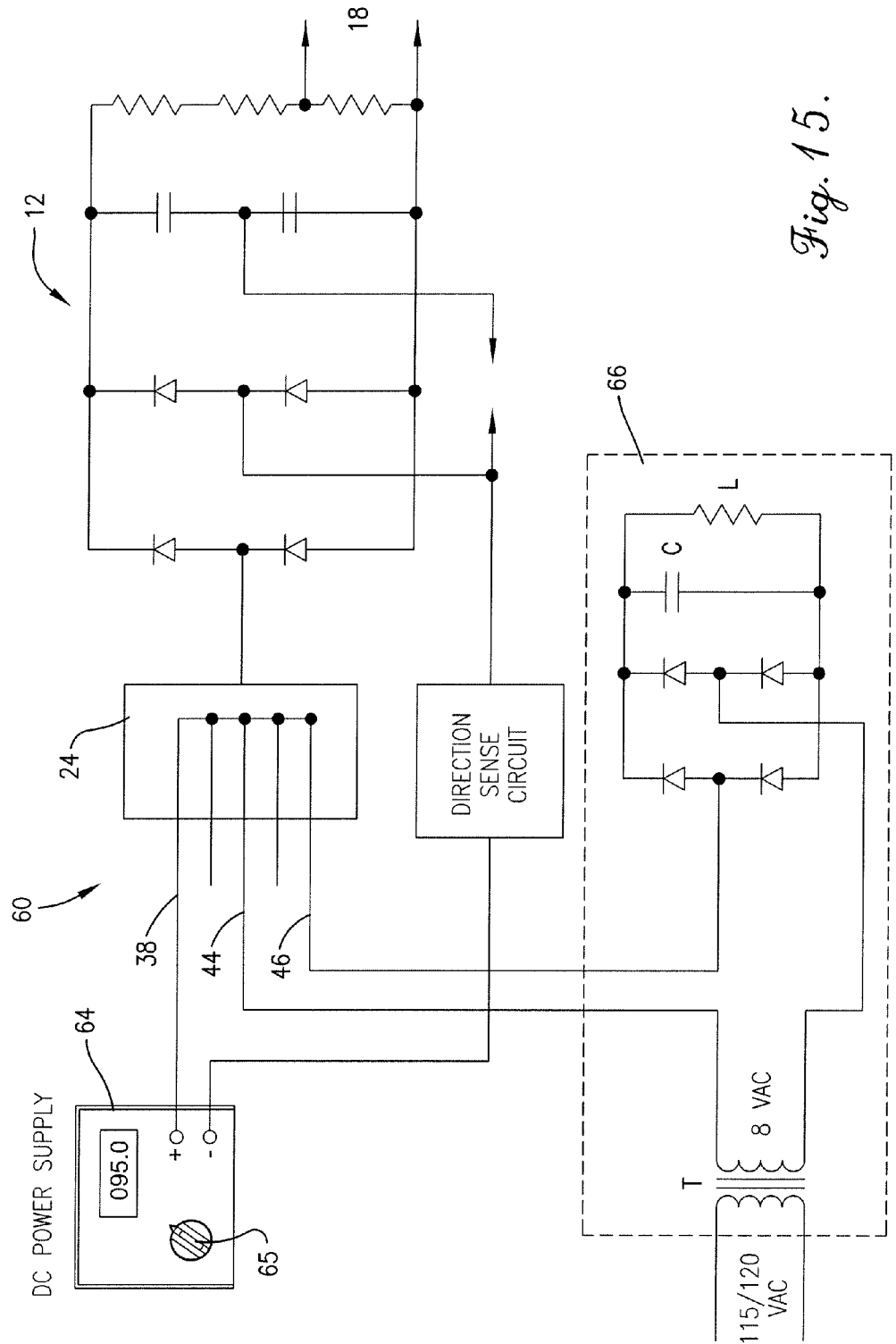
FIG. 15 is a schematic circuit diagram showing details of the torque adjustment mechanism.

FIG. 15 illustrates the circuitry of an embodiment of the torque adjust mechanism 60 in more detail. The circuitry may include a regulated DC power supply 64 with a selector switch 65 and an isolated current waveform generator 66. The circuitry instructs the motor controller 18 of the blower motor assembly 10 or 100 to change its torque settings by an adjustment factor indicated by the DC volts output by the DC power supply 64. The selector switch 65 may have several positions (such as the XYZ and ABC positions described above) or may permit the selection of any DC output value within a range such as 60-100 volts (corresponding to 60% to 100% of the maximum rated torque of the motor). The output of the DC power supply 64 is connected to one of the power inputs 38 of the power input connector 24 and the diode bridge rectifier 12 of the blower motor assembly and charges the motor's DC bus to the selected voltage level (e.g. 60-100 volts). The isolated current waveform generator 66 is connected to two of the power inputs 44, 46 of the power input and includes an isolated 6-8 volt transformer T that charges a capacitor C with a DC load L. This generates an input current on the power inputs 44, 46 identical to that of the blower motor during its normal operation. This input current is routed into one of the inputs 44 and out of the other 46 while the DC power is applied to the DC bus to modify the torque settings of the motor in accordance with the output of the DC power supply. For example, if the selector switch 65 on the DC power supply 64 is set to output 60 volts, all of the torque settings of the motor are proportionally scaled down to 60% of their original values.

The motor controller 18 is programmed to recognize this otherwise unusual circumstance of having current applied to it even though the applied voltage is too low for the motor controller 18 to run the motor and draw any significant current. When the motor controller recognizes this, it changes its torque settings in accordance with the input voltage.

A feedback mechanism may also be provided to indicate that the torque settings of the motor have been changed. For example, the motor could run at no load to a specific RPM to indicate the new torque adjustment factor. An RPM of 600 could correspond to a 60% adjustment factor and an RPM of 1,000 could correspond to a 100% adjustment factor.

Instead of adjusting the torque as described above, the motor controller 18 could store a plurality of different torque or speed tables and select one of the torque/speed tables based on an input provided by the torque adjustment mechanism. For example, when the torque adjustment mechanism is attached to the blower motor assembly and set to output 60 volts, the motor controller may select torque/speed table #1 from its memory, when the torque adjustment mechanism is set to output 61 volts, the motor controller may select table #2, etc.

Although the invention has been described with reference to the embodiments illustrated in the attached drawing figures, it is noted that equivalents may be employed and substitutions made herein without departing from the scope of the invention as recited in the claims. For example, while the invention has been described in connection with 115 VAC distribution systems, it is not limited to 115 VAC distribution systems. One skilled in the art will recognize that, with obvious modifications of implementation details, the invention may be adapted to other power distribution systems and voltages in use in the United States and elsewhere, including, but not limited to, 230 VAC distribution systems. Further, although many aspects of the present invention are particularly applicable to HVAC blower motors, they may also be used with electric motors designed for other applications. Moreover, all of the above-described embodiments of the invention are independent of motor technology, and induction, brushless permanent magnet, switched reluctance, brushed DC, and other types of motors may be used. The invention is also compatible with a variety of converter topologies, both for AC to DC and AC to AC conversion, including phase control using a thyristor full converter or semiconverter. Related technologies are also disclosed in U.S. Pat. No. 5,818,194, which is hereby incorporated by reference in its entirety.

Having thus described the exemplary embodiment of the invention, what is claimed as new and desired to be protected by Letters Patent includes the following:

1. A blower motor assembly comprising:
    a variable speed motor and motor controller;
    a power input electrically coupled with the motor controller and comprising a first power input and a second power input for receiving AC power from an AC power source;
    a sensing circuit for sensing power applied to the first power input or the second power input and for delivering a corresponding signal to the motor controller for selecting a corresponding operating parameter for the motor; the sensing circuit including:
        a current transformer for sensing current in at least one of the first power input and the second power input,
        a single transistor coupled with the current transformer for amplifying an output of the current transformer, and
        a capacitor coupled directly to an input of the motor controller such that a voltage across the capacitor is the same as a voltage of the corresponding signal to the motor controller.

2. The blower motor assembly as set forth in claim 1, wherein the capacitor is charged and discharged in response to current pulses from the current transformer and the transistor for providing the signal to the motor controller.

3. The blower motor assembly as set forth in claim 1, further including a rectifier coupled between the power input and the motor controller for converting the AC power to DC power and delivering the DC power to the motor controller.

4. The blower motor assembly as set forth in claim 1, the current transformer comprising a toroidal core transformer.

5. The blower motor assembly as set forth in claim 4, wherein the toroidal core transformer has 30 or more turns.

6. The blower motor assembly as set forth in claim 1, the sensing circuit further including a resistor coupled in parallel between the current transformer and the transistor for defining a minimum load on the current transformer.

7. The blower motor assembly as set forth in claim 1, the sensing circuit further including a resistor coupled in series between the current transformer and the transistor for limiting current delivered to the transistor by the current transformer.

8. The blower motor assembly as set forth in claim 1, the sensing circuit further including a diode coupled in parallel between the current transformer and the transistor for protecting a base emitter junction of the transistor.

9. The blower motor assembly as set forth in claim 1, the sensing circuit further including a resistor coupled between the transistor and the capacitor for limiting current delivered to the capacitor from the transistor.

10. The blower motor assembly as set forth in claim 1, the sensing circuit further including a resistor coupled between a voltage source and the capacitor for charging the capacitor.

11. The blower motor assembly as set forth in claim 1, wherein the variable speed motor is a brushless permanent magnet motor.

12. The blower motor assembly as set forth in claim 1, wherein the operating parameter is at least one of a speed of the motor and a torque of the motor.

13. A blower motor assembly comprising:
    a variable speed motor and motor controller;
    a power input electrically coupled with the motor controller and comprising first and second inputs for receiving AC power from an AC power source; and
    a sensing circuit for sensing power applied to the first or second power input and for delivering a corresponding signal to the motor controller for selecting a corresponding operating parameter for the motor, the sensing circuit being operable to sense an instantaneous peak current as low as two amps in the first or second power inputs, and the sensing circuit including
        a current transformer for sensing current in the first or second inputs,
        a single transistor coupled with the current transformer for amplifying an output of the current transformer, and
        a capacitor coupled directly to an input of the motor controller such that a voltage across the capacitor is the same as a voltage of the corresponding signal to the motor controller.

14. The blower motor assembly as set forth in claim 13, the sensing circuit being operable to sense an instantaneous peak current as low as one amp in the first or second power inputs.

15. The blower motor assembly as set forth in claim 13, wherein the capacitor is charged and discharged in response to current pulses from the current transformer and the transistor for providing the signal to the motor controller.

16. The blower motor assembly as set forth in claim 13, further including a rectifier coupled between the power input and the motor controller for converting the AC power to DC power and delivering the DC power to the motor controller.

17. The blower motor assembly as set forth in claim 13, the current transformer comprising a toroidal core transformer.

18. The blower motor assembly as set forth in claim 17 wherein the toroidal core transformer has 30 or more turns.

19. The blower motor assembly as set forth in claim 13, the sensing circuit further including a resistor coupled in parallel between the current transformer and the transistor for defining a minimum load on the current transformer.

20. The blower motor assembly as set forth in claim 13, the sensing circuit further including a resistor coupled in series between the current transformer and the transistor for limiting current delivered to the transistor by the current transformer.

21. The blower motor assembly as set forth in claim 13, the sensing circuit further including a diode coupled in parallel between the current transformer and the transistor for protecting a base emitter junction of the transistor.

22. The blower motor assembly as set forth in claim 13, the sensing circuit further including a resistor coupled between the transistor and the capacitor for limiting current delivered to the capacitor from the transistor.

23. The blower motor assembly as set forth in claim 13, the sensing circuit further including a resistor coupled between a voltage source and the capacitor for charging the capacitor.

24. The blower motor assembly as set forth in claim 13, wherein the variable speed motor is a brushless permanent magnet motor.

25. The blower motor assembly as set forth in claim 13, wherein the operating parameter is at least one of a speed of the motor and a torque of the motor.

* * * * *